United States Patent [19]

Smart et al.

[11] Patent Number: 5,612,759
[45] Date of Patent: Mar. 18, 1997

[54] VARIABLE FORMAT VIEWFINDER

[75] Inventors: David C. Smart, Fairport; John H. Alligood, Penfield, both of N.Y.

[73] Assignee: Eastman Kodak Company, Rochester, N.Y.

[21] Appl. No.: 637,117

[22] Filed: Apr. 24, 1996

[51] Int. Cl.⁶ .................................................. G03B 13/10
[52] U.S. Cl. ................................................................ 396/380
[58] Field of Search ............................ 354/94, 159, 219, 354/222

[56] References Cited

U.S. PATENT DOCUMENTS

| 2,552,940 | 5/1951 | Cornut | 354/222 |
|---|---|---|---|
| 3,882,520 | 5/1975 | Kamp et al. | 354/197 |
| 3,903,537 | 9/1975 | Ettischer | 354/197 |
| 4,032,939 | 6/1977 | Elton | 354/197 |
| 4,357,102 | 11/1982 | Taren et al. | 355/77 |
| 4,716,427 | 12/1987 | Shyu | 354/159 |
| 4,961,085 | 10/1990 | Cho et al. | 354/295 |
| 4,973,997 | 11/1990 | Harvey | 354/106 |
| 5,021,815 | 6/1991 | Harvey | 354/222 |
| 5,059,994 | 10/1991 | Harvey | 354/222 |
| 5,146,253 | 9/1992 | Swayze | 354/187 |
| 5,430,517 | 7/1995 | Zander | 354/222 |
| 5,438,380 | 8/1995 | Muramatsu | 354/105 |

*Primary Examiner*—Safet Metjahic
*Assistant Examiner*—Eddie C. Lee
*Attorney, Agent, or Firm*—Peter J. Bilinski

[57] ABSTRACT

A viewfinder for a camera includes a front masking portion and a movable rear masking portion for providing multiple frame-defining formats in a viewing area. According to the invention, the front masking portion includes a pair of independently movable masking plates which are separately attached to the rear masking portion by a pair of cam follower levers which allow one of the front masking plates to move into the field of view of the viewfinder when the rear masking portion is moved a first increment and to move the other front masking plate into the viewfinder field of view when the rear masking portion is moved a second increment. An overcenter spring assists in effecting each of the format defining positions.

9 Claims, 8 Drawing Sheets

VARIABLE FORMAT VIEWFINDER

CROSS REFERENCE TO RELATED APPLICATION

Reference is made to and priority claimed from U.S. Provisional application Ser. No. U.S. 60/004,554, filed Sep. 29, 1995, entitled VARIABLE FORMAT VIEWFINDER.

FIELD OF THE INVENTION

The invention relates generally to the field of photography, and in particular to viewfinders for use in photographic cameras. More specifically, the invention relates to a viewfinder having variably movable front and rear masking blades whereby movement of the rear masking blade causes corresponding selective movement of a pair of front masking blades to define a plurality of format defining positions in the field of view of the viewfinder.

BACKGROUND OF THE INVENTION

Viewfinders are commonly known in the field of photography which utilize a field of view to provide an image or frame-defining format which is representative of the dimensional characteristics of the image to be captured by the user.

In the advent of providing different sized formats to define the size of a particular image, it is preferred in some instances to have a viewfinder in which the field of view can be selectively masked to define more than one format.

In such a viewfinder, the field of view is the largest in its unmasked state, preferably defining a wide-image (or HDTV, known as high-definition television) format having an aspect ratio of about 1.83.

Though well suited for some photographic situations, there are other situations in which a different aspect ratio suits the composition of the image to be taken. A second format, which is most well known is the so-called normal format, having the same height as the first unmasked format and a correspondingly shorter length, providing an aspect ratio of approximately 1.50.

A third photographic format, known as the panoramic format includes the same length as the HDTV format, but less height, thereby defining an aspect ratio of approximately 2.83. This particular format is more well suited than the normal format for some outdoor scenes. It is useful to provide a viewfinder assembly which can selectively define a field of view for a particular format.

A problem in defining a variable format viewfinder is that there are a number of spacing problems which make positioning of multiple masking blades difficult without enlarging the size of the camera. The latter is an undesirable result, in that cameras having compact designs are greatly preferred, and possess a number of other inherent advantages.

It is desired, therefore, to provide a viewfinder having a field of view which can easily be masked in order to indicate a plurality of different format positions in a simple and yet compact manner.

SUMMARY OF THE INVENTION

The present invention is directed to overcoming one or more of the problems set forth above. Briefly summarized, according to one aspect of the present invention, there is provided a camera comprising a viewfinder field of view, a rear masking blade having two different format-defining rear openings individually positionable in the field of view, and movable front masking means having two different format-defining front openings corresponding to said respective rear openings and individually positionable in the field of view, characterized in that:

said front masking means includes two separably movable masking blades each having one of said front openings; and means interconnecting said rear masking blade with said two front masking blades to cause a first incremental movement of the rear masking blade to position one of the rear openings in the field of view to move one of the front masking blades to position its front opening in the field of view and to cause a second incremental movement of the rear masking blade to position the other rear opening in the field of view to move the other front masking blade to position its front opening in the field of view.

In a preferred embodiment, the front opening of the first front masking blade is moved out of the field of view during the second incremental movement.

According to another aspect of the present invention, there is provided a camera comprising a viewfinder having a front masking section having two format-defining front openings and a movable rear masking blade having two different format-defining rear openings corresponding to said front openings which are individually positionable in a viewing area, characterized in that:

the front masking portion includes a pair of independently movable masking blades, each said blade having a different front format-defining opening; and cam means separately interconnecting said rear masking blade with each of said movable front masking blades for allowing at least one of said front masking blades to position its front opening in the viewing area when said rear masking blade moves a first increment to position one of the rear openings in the viewing area, and moves the other of said front masking blades to position its front opening in the viewing area when the rear masking blade is moved a second increment to position the other rear opening in the viewing area.

Preferably, the front opening of the first front masking blade is moved out of the viewing area during the second incremental movement.

An advantageous feature of the present invention is that simple movement of the rear masking portion of the viewfinder enables the user to select a number of different format-defining positions which enable the respective apertures of the front and rear masking plates into and out of the viewing area along with the rear masking apertures to provide normal, panoramic, and wide-vision or HDTV-type imaging formats.

Another advantage of the present invention is that viewfinder masking can be done using a minimum number of parts. More importantly, the format selection can be done using a minimum of space, making the assembly quite desirable, particularly for compact cameras, such as single-use cameras.

These and other aspects, objects, features and advantages of the present invention will be more clearly understood and appreciated from a review of the following Detailed Description of the Preferred Embodiments and appended Claims, and by reference to the accompanying drawings.

DETAILED DESCRIPTION OF THE INVENTION

Figure 1:
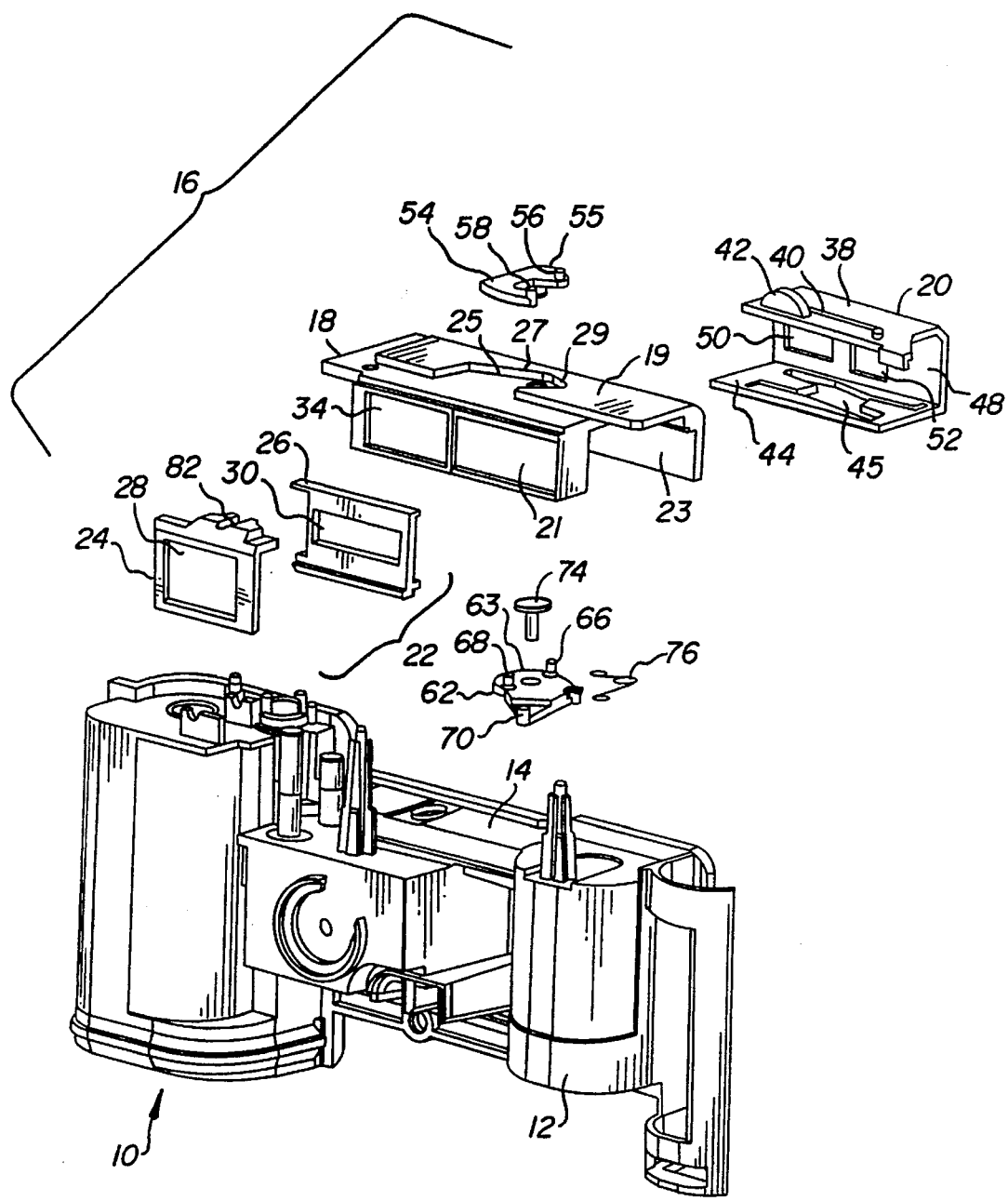
FIG. 1 is a partial exploded view of a camera having a viewfinder in accordance with a preferred embodiment of the present invention.

Beginning with FIG. 1, there is shown a camera 10 comprising a frame 12 including a top surface 14 for mounting thereto a viewfinder masking assembly 16 in accordance with a preferred embodiment of the present invention.

It is assumed that the operation of the camera 10 and features related thereto for image capture, etc., are commonly known in the field of photography. Therefore, no further discussion of the camera or these features is required, except in order to more clearly define the present invention.

The viewfinder masking assembly 16 consists of a main viewfinder body 18 having attached thereto a rear masking portion 20 and a front masking portion 22. The front masking portion 22 includes a pair of independently movable masking plates 24, 26, each having an aperture 28, 30 defining a different aspect ratio for presentation to a viewing area 34 of the main viewfinder body 18. For purposes of this embodiment, the front aperture 28 has a length to width dimensional aspect ratio of 1.50, and the front aperture 30 has a length to width dimensional aspect ratio of 2.83.

The main viewfinder body 18 is a molded unitary plastic section consisting of a top surface 19, a front surface 21, and a rear surface 23. A portion of the top surface 19 is raised slightly to form a recess 25. The front and rear surfaces 21, 23 include respectively aligned portions defining a transparent window, or viewing area 34, hereinafter also referred to as a field of view.

The rear masking portion 20 is sized to fit over the main viewfinder body 18 and includes a top plate 38, a bottom plate 44, and a rear masking plate 48. The spacing between the top and bottom plates 38, 44 is sufficient to allow the rear masking portion 20 to be snugly fitted over the viewfinder main body 18, while allowing the rear masking portion 20 to still be translatable along the rear surface 23 and the raised portion of the top surface 19 of the viewfinder main body 18, which is stationarily secured to the top surface 14 of the camera frame 12 by known means.

The top plate 38 of the rear masking portion 20 includes a cam slot 40 for accommodating a pin 56 from a normal mask lever 54, which is introduced between the top surface 19 of the viewfinder main body 18 and the top plate 38. The cam slot 40 is substantially parallel to the major dimension of the top plate 38 with the exception of an outwardly bent portion 43, FIG. 3(a), at the end of the slot furthest from the centerline 15, FIG. 3(a), of the camera 10 when the viewfinder masking assembly 16 is mounted to the camera frame 12.

The bottom plate 44 of the rear masking portion 20 includes a camming configuration 45 for accommodating a pair of pins 66, 68 from a panoramic mask lever 62 which is introduced between the top surface 14 of the frame 12 and the bottom plate 44. The camming configuration 45 is used to coordinate the relative movement of the front masking plate 26 with the motion of the portion 20, and is described in greater detail below.

Finally, the rear masking plate 48 of the rear masking portion 20 includes a pair of spaced apertures 50, 52, each of which like the corresponding front apertures 30, 28 of the front masking plates 24, 26 define a different aspect ratio. According to this embodiment, the aperture 50 has a panoramic frame-defining aspect ratio; that is, having a length to width dimensional aspect ratio of 2.83, while the front aperture 52 has a normal frame-defining aspect ratio, that is, a length to width dimensional aspect ratio of about 1.50. In this embodiment, each of the rear apertures 50, 52 correspond to the front apertures 30, 28, as to relative aspect ratios. It should be apparent from the following discussion, however, that other apertures defining other aspect ratios can easily be substituted.

As noted above, a pair of cam follower levers 54, 62 are used to separately interconnect the rear masking portion 20 with the front masking portion 22, and particularly with the front masking plates 24, 26, respectively.

Figure 3A:
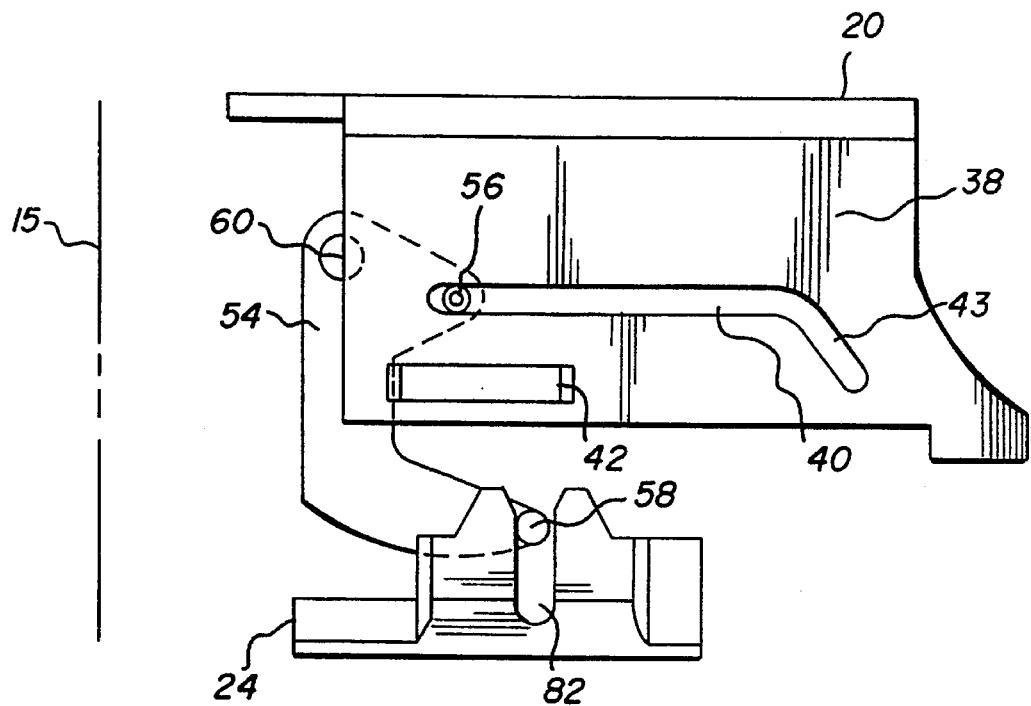
FIGS. 3(a) and 3(b) are partial top views of the viewfinder showing the positioning of the panoramic and normal masking elements in the first format position.

The normal mask lever 54 fits within the recess 25 of the top surface 19 of the viewfinder main body 18 and is mounted thereto by a single stud 60, FIG. 3(a), so as to be pivotable. The recess 25 is defined to allow the normal mask lever 54 to freely pivot in either a clockwise or counterclockwise direction about the pivot 60, and includes a pair of clearance surfaces 27, 29 to allow pivoting of the mask lever 54 to occur. A pair of pins 56, 58 depending from a top surface 55 and disposed on opposite ends of the normal mask lever 54 engage the cam slot 40 of the rear masking portion 20 and a slot 82 provided on the rear of one of the front masking plates 24, respectively, to interconnect the rear masking portion 20 and the front masking plate 24.

The panoramic mask lever 62 is mounted directly to the top surface 14 of the camera frame 12, such as by means of a stud 74, and is also pivotable. A pair of clearance surfaces 31, 33, FIG. 3(b), located on the top surface 14 of the frame 12 are disposed to prevent excessive rotation of the mask lever 62. Three spaced pins 66, 68, 70 extend from the top surface 63 of the panoramic mask lever 62. Pins 66, 68 are circularly arranged at one end of the mask lever 62 relative to the stud 74 and are specifically spaced to fit within the camming configuration 45 of the bottom plate 44, while pin 70 is arranged at the remaining end of the mask lever 62 for placement within a slot 84, FIG. 3(a); that is, provided in the rear of the other front masking plate 26. The panoramic mask lever 62 therefore interconnects the rear masking portion 20 with the front masking plate 26.

Figure 3B:
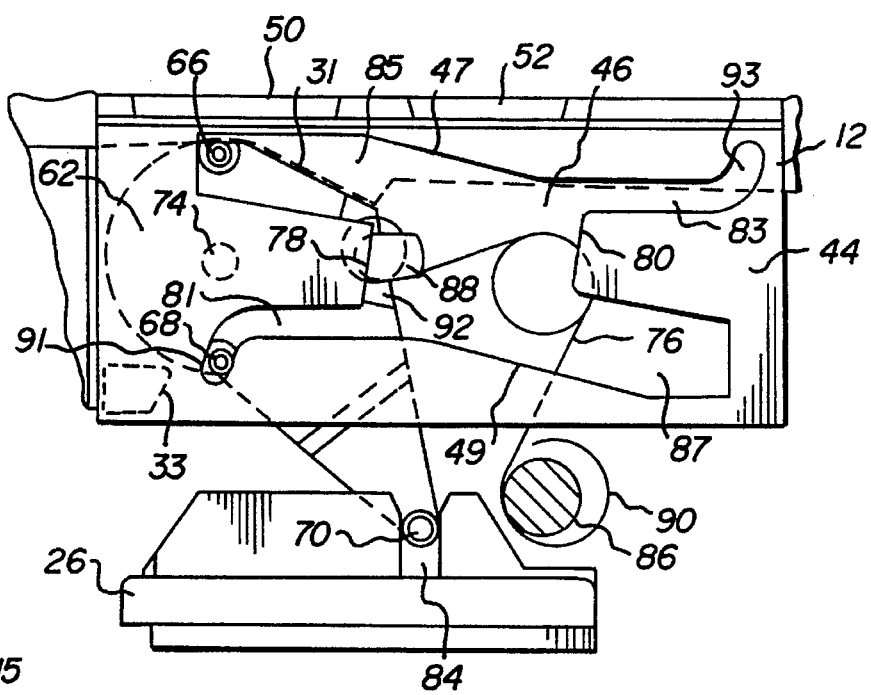

Referring specifically to FIG. 3(b), the camming configuration 45, FIG. 1, of the bottom plate 44 includes a cutout or enlarged open region 46 in the center of the bottom plate which is bounded by a top and bottom cam surface 47, 49, as well as a pair of beveled side cam surfaces 78, 80 that are oppositely disposed from one another. Cam slots 81, 83, 85, 87 extend outwardly from the cutout region 46 at the ends of the side cam surfaces 78, 80, also for engaging the pins 66, 68 of the panoramic mask lever 62 as the rear masking portion 20 is translated across the viewfinder main body 18. The cam slots 81 and 83 are oppositely situated across the cutout region 46 from one another and include bent sections 91, 93 for causing the panoramic mask lever 62 to selectively pivot about the stud 74 in either a clockwise or counterclockwise direction, as described in greater detail below.

Figure 8:
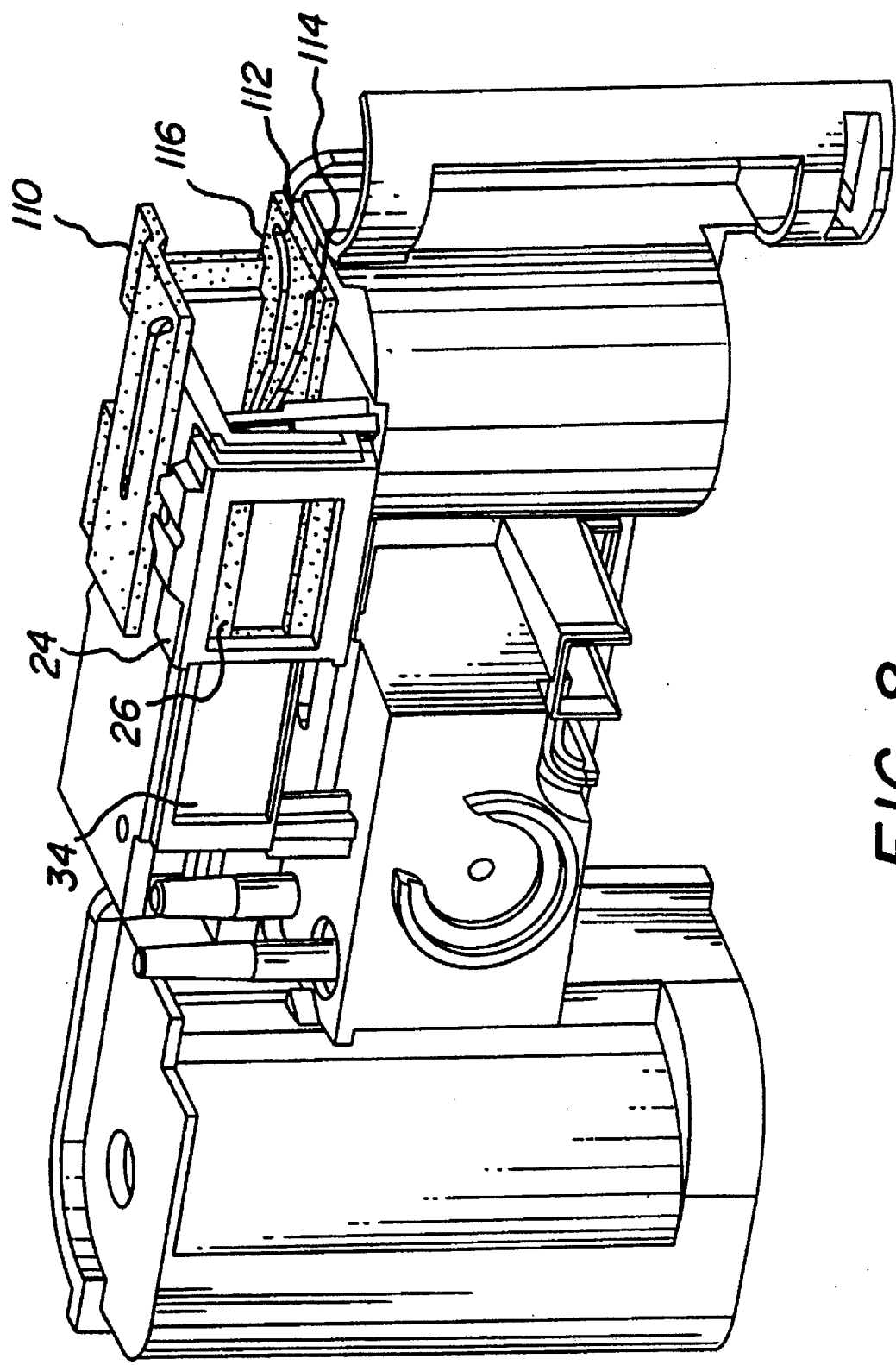
FIG. 8 is a front perspective view of a viewfinder according to a second embodiment of the present invention.

Alternatively, the bottom plate 44 can include other cam configurations. For example, and referring to FIG. 8, a rear masking portion 110 can be provided which utilizes a pair of cam slots 112, 114 in the bottom plate 116 having opposing curvatures for engaging pins 66 and 68, FIG. 1, and for causing the panoramic mask lever 62, FIG. 1, to pivot in both a clockwise and counterclockwise direction as the rear masking portion 20, FIG. 1, is translated incrementally across the viewfinder main body 18, FIG. 1; rather than providing the previously defined cutout region 46. As will be apparent from the succeeding discussion, other such configurations can logically be imagined.

An overcenter spring 76 includes a pair of ends 90, 92 which are mounted to a post 86 of the frame 12 and to a post 88 located on the panoramic mask lever 62, respectively. The purposes of the overcenter spring 76 as well as the configuration of the cam engagement surfaces provided on the top and bottom plates 38, 44 of the rear masking portion 20 are described in greater detail below.

OPERATION OF THE VIEWFINDER

The operation of the viewfinder masking assembly 16, FIG. 1, according to the preferred embodiment is herein described with reference to FIGS. 2(a)–7(b). As described herein, the viewfinder masking assembly 16 allows three specific format-defining or image-defining positions to be selected by a user.

A. First Format Position

For purposes of the discussion which follows, and initially according to this embodiment, the viewing area (also interchangeably referred to as the field of view) 34 of the viewfinder main body 18 is unobstructed by either of the front or rear format-defining apertures 28, 30, of the front masking blades, and apertures 50, 52, of the rear masking blade 48.

In this specific format position, the viewing area 34 of the viewfinder 16 is at its largest as perceived by a user. According to this embodiment, each of the windows of the front and rear 21, 23 surfaces of the viewing area 34 have a length to width dimensional aspect ratio of 1.83. This format is often referred to as wide-vision or HDTV (high definition television) which advantageously can be used as an imaging format.

Referring to FIGS. 3(a) and 3(b), the positions of each of the front masking plates 24, 26 relative to the rear mask portion 20 can be separately illustrated and described for clarity.

Figure 2A:
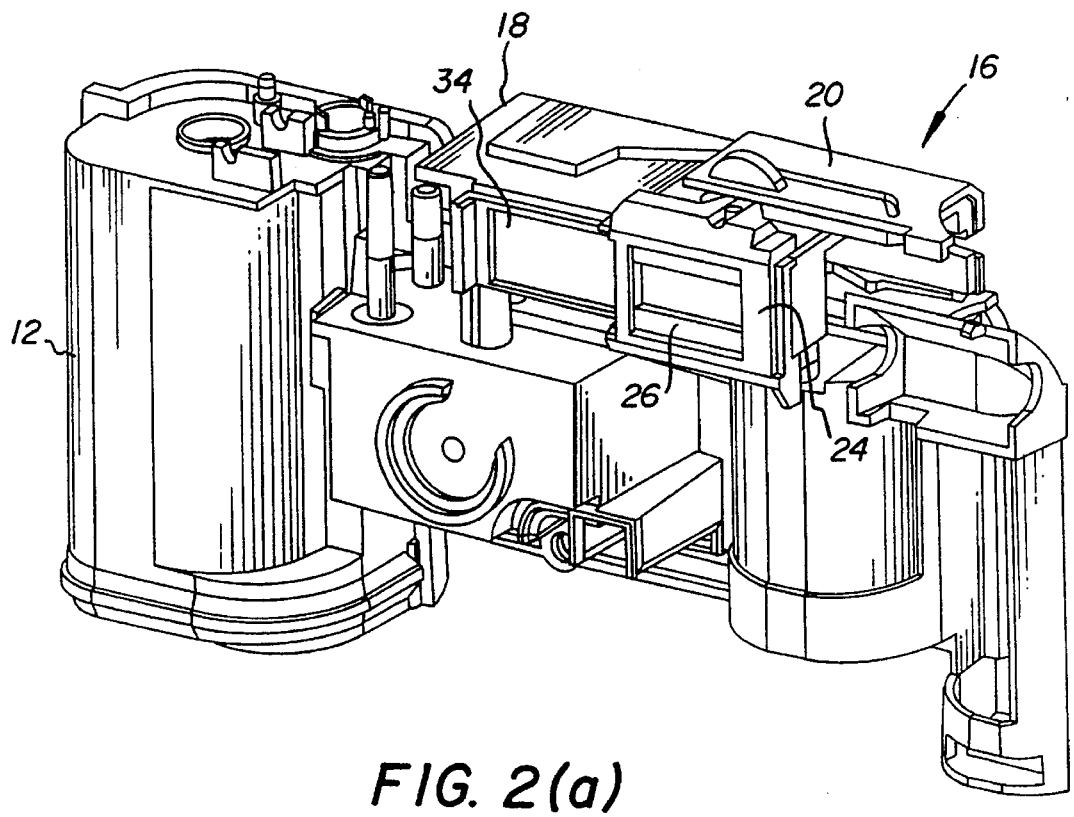
FIGS. 2(a) and 2(b) are front and rear perspective views respectively of the camera of FIG. 1, showing the viewfinder positioned in a first unmasked format position.

Referring specifically first to FIGS. 2(a) and 3(a) and in this initial format position, the front masking plate 24, hereinafter referred to as the normal mask based on the size of the aperture 28, is aligned in an initial position fully out of the field of view 34 by positioning the pin 56 of the normal mask lever in the cam slot 40 of the top plate 38 of the rear masking portion 20 such that the pin is at the end of the straightened portion of the slot.

Similarly, and referring now to FIGS. 2(b) and 3(b), the other front masking plate 26, hereinafter referred to as the front panoramic mask due to the size of the front aperture 30, is also in a retracted initial position, relative to the field of view 34 by positioning the pins 66, 68 of the panoramic mask lever 62 at the ends of the slots 81, 85, respectively, of the camming configuration 45, FIG. 1, in the bottom plate 44 of the rear masking portion 20.

The normal mask 24 according to this embodiment is mounted to the front surface 21 of the viewfinder main body 18 with sufficient clearance to allow the panoramic mask 26 to fit within the normal mask 24, and to allow the panoramic mask to slide or translate in an independent manner relative to the normal mask 24. In the initial position, the normal mask 24 covers the panoramic mask 26, while the field of view 34 is unobstructed by either of the front apertures 28, 30. See FIG. 2(a).

Figure 2B:
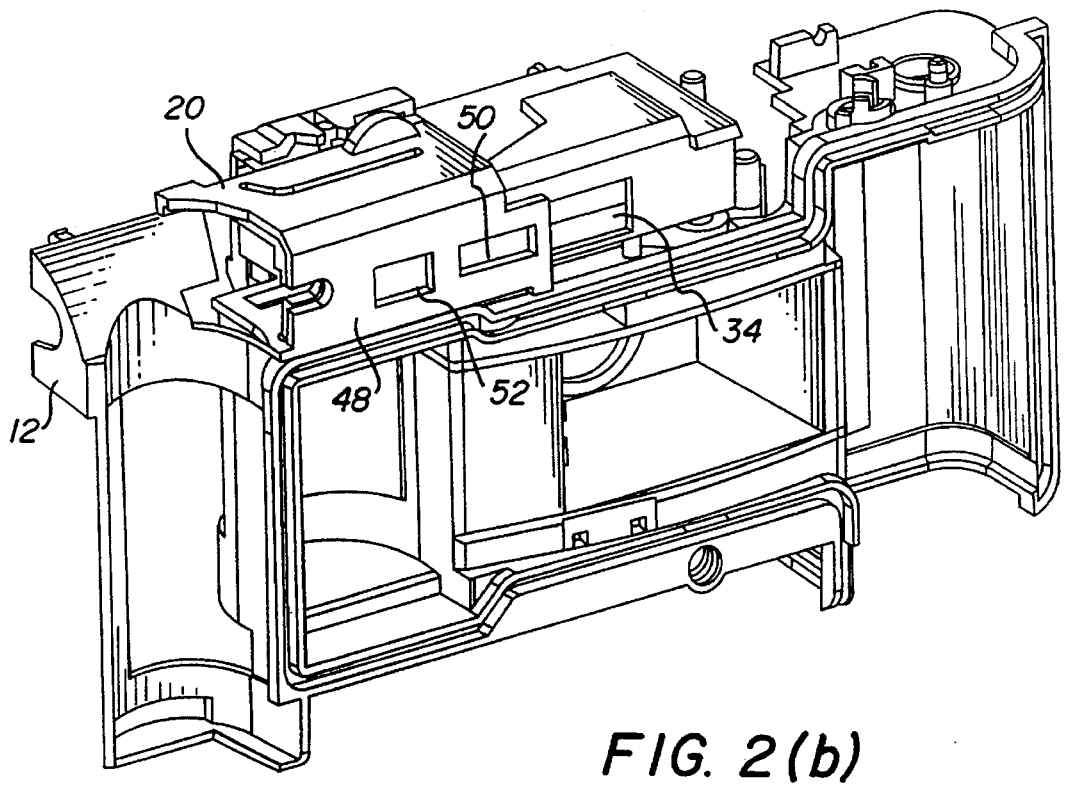

Similarly, and as seen in FIG. 2(b), the rear portion of the viewing area 34 is also unobstructed by either of the rear apertures 50, 52.

The overcenter spring 76 assists in biasing the panoramic mask lever 62 in this initial position against the stop surface 31 of the frame 12.

B. Second Format Position

Referring now to FIGS. 4(a)–5(b), a first incremental movement of the translatable rear masking portion 20 defines a second format-defining position. The slider 42 on the top plate 38 can be used to translate the rear masking portion 20 along a slot (not shown) in the camera frame 12 to the left (using the convention of viewing the camera 10 from the front as shown in the FIGS.).

Figure 5A:
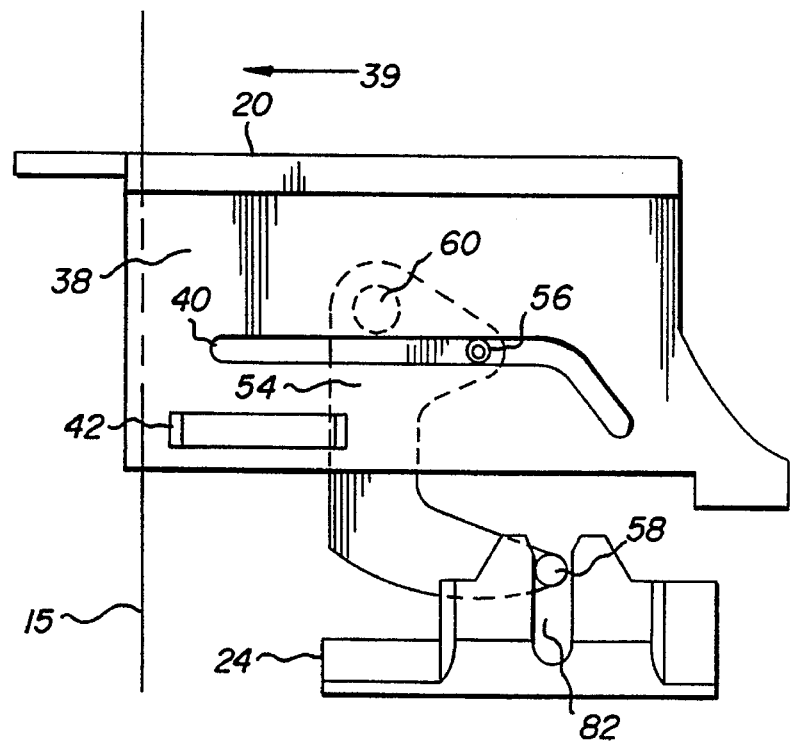
FIGS. 5(a) and 5(b) are partial top views of the viewfinder showing the positioning of the normal and panoramic masking elements in the second format position relative to the rear mask.
Figure 5B:
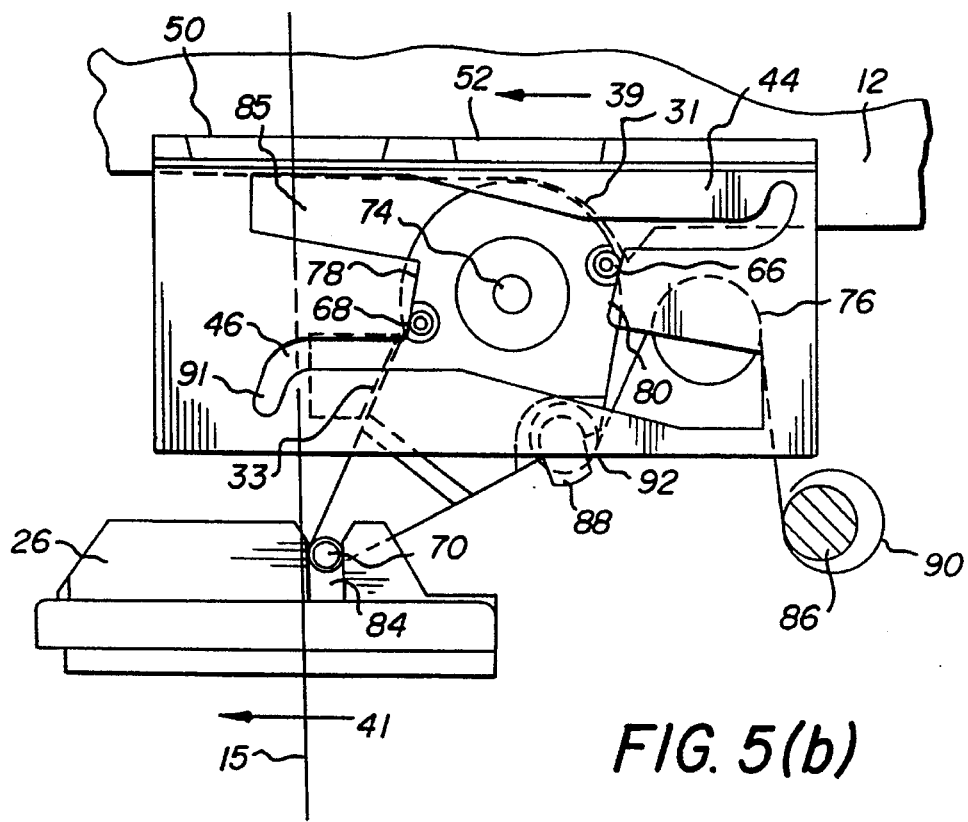

Movement of the rear masking portion 20 as described produces the following associated movements of the front masking plates 22, 24, which are now individually described by separately referring to FIGS. 5(a) and 5(b). Turning first to FIG. 5(a), translation of the top plate 38 of the rear masking portion 20 is shown by arrow 39. The translation of the top plate 38 in this direction as described produces no corresponding movement of the front masking plate 24 because the pin 56 of the normal mask lever 54 remains stationary over the straightened portion of the cam slot 40. The normal mask 24, therefore, remains in its initial position, relative to the viewing area 34 of the viewfinder main body 18.

Figure 4A:
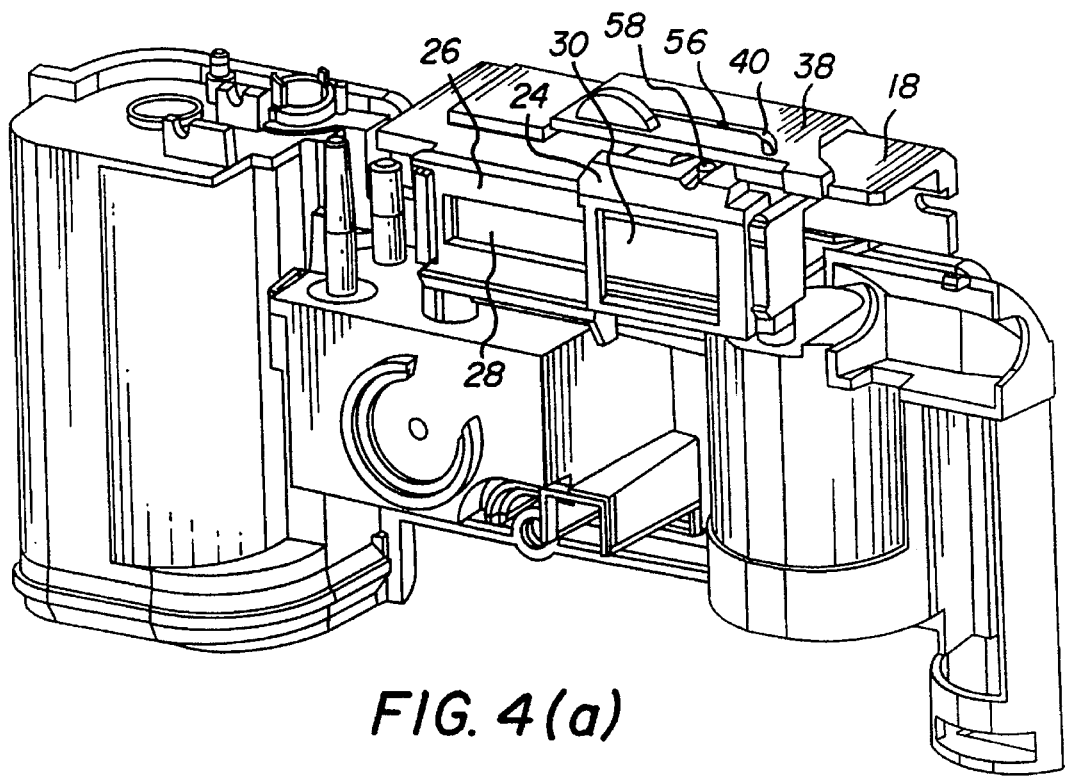
FIGS. 4(a) and 4(b) are front and rear perspective views, respectively; of the camera of FIG. 1, showing the viewfinder in a second format position.
Figure 4B:
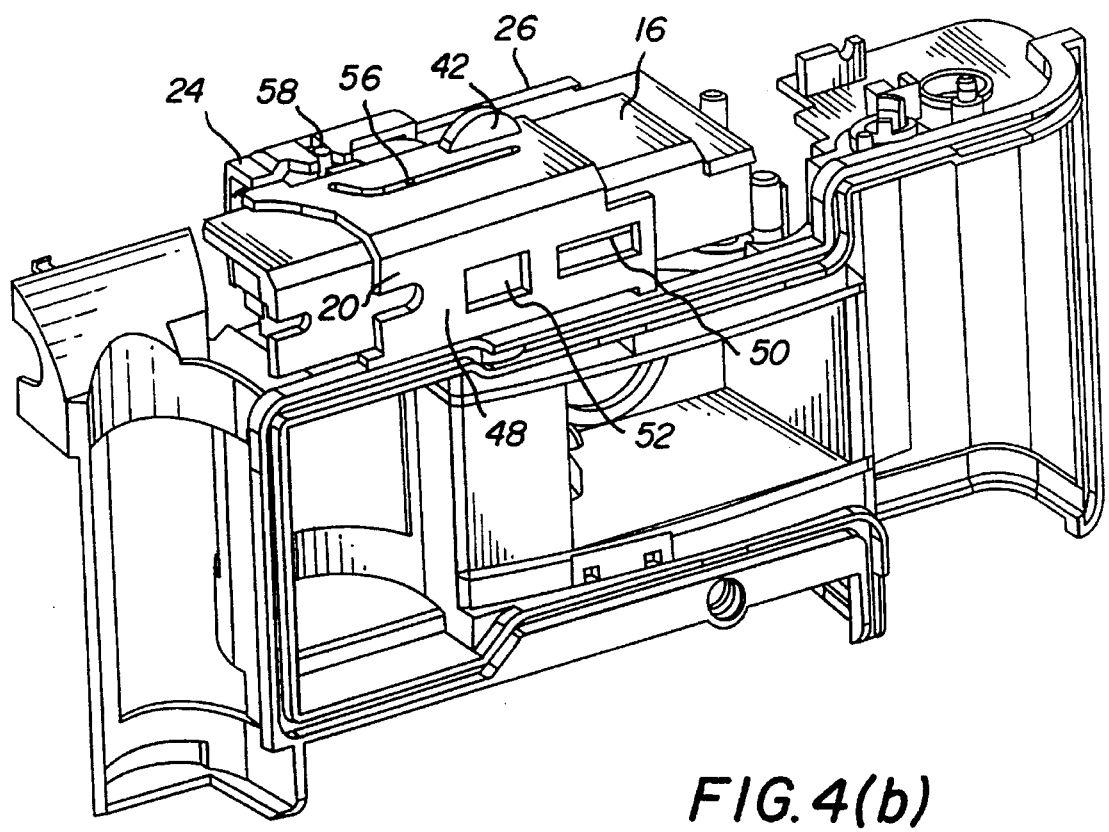

Turning to FIGS. 3(b), 4(b) and 5(b), and as the bottom plate 44 of the rear masking portion 20 begins to translate to the left per arrow 39, the panoramic mask lever 62 is immediately caused to pivot in a clockwise manner about the stud 74, due to bearing of the pin 68 against the inward curved portion 91 of the slot 81. This rotational movement of the panoramic mask lever 62 causes the pin 70 on the other side of the mask lever 62 to similarly bear against the inside of the slot 84 in the rear of the panoramic mask 26, causing the mask to translate toward the viewing area 34, as shown by arrows 41. As the rear masking portion 20 continues to translate, the panoramic mask lever 62 continues to rotate in a clockwise direction, until each of the pins 66, 68 are engaged with respective side cam surfaces 78, 80, and preferably the mask lever is prevented from further rotation by engagement with the clearance surface 33 on the top surface 14 of the camera frame 12.

The overall incremental movement of the rear masking portion 20 to the described intermediate format position also aligns the frame defining aperture 50 of the rear masking plate 48 with the viewing area 34 of the viewfinder 16 and substantially with the aperture 30 of the panoramic mask 26, defining a panoramic imaging format in the field of view.

C. Third Format Position

Figure 6A:
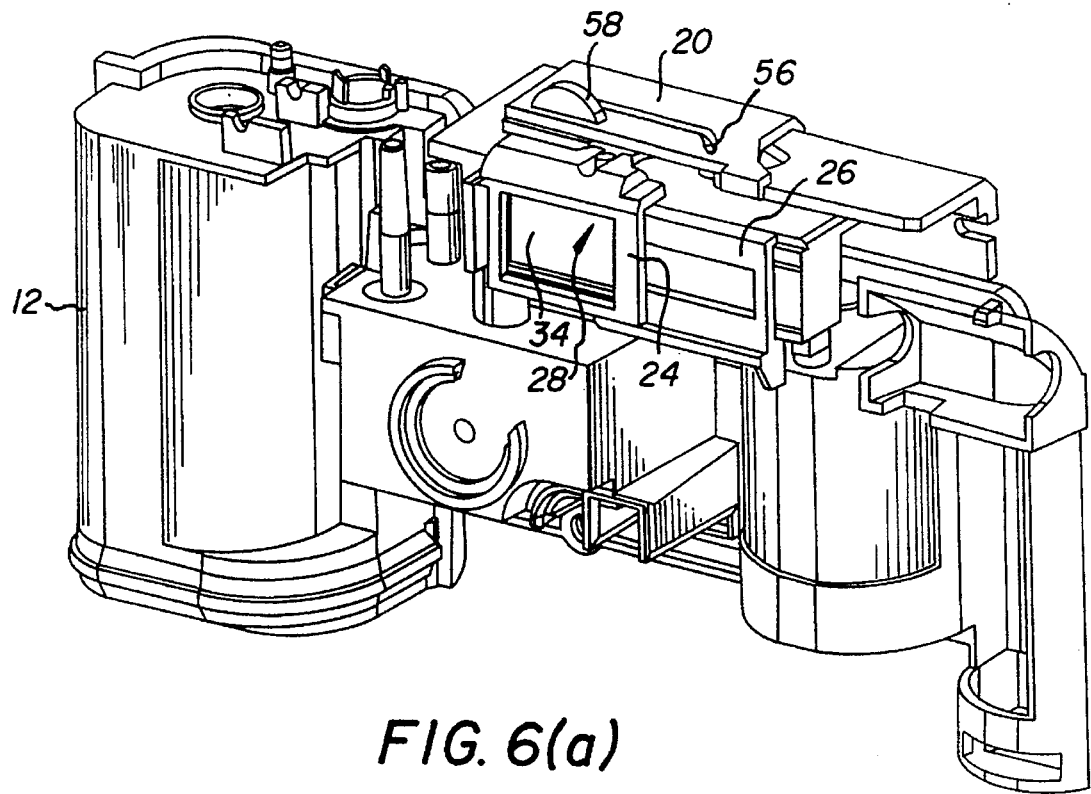
FIGS. 6(a) and 6(b) are front and rear perspective views, respectively, of the camera shown in FIG. 1, showing the viewfinder in a third format position.
Figure 6B:
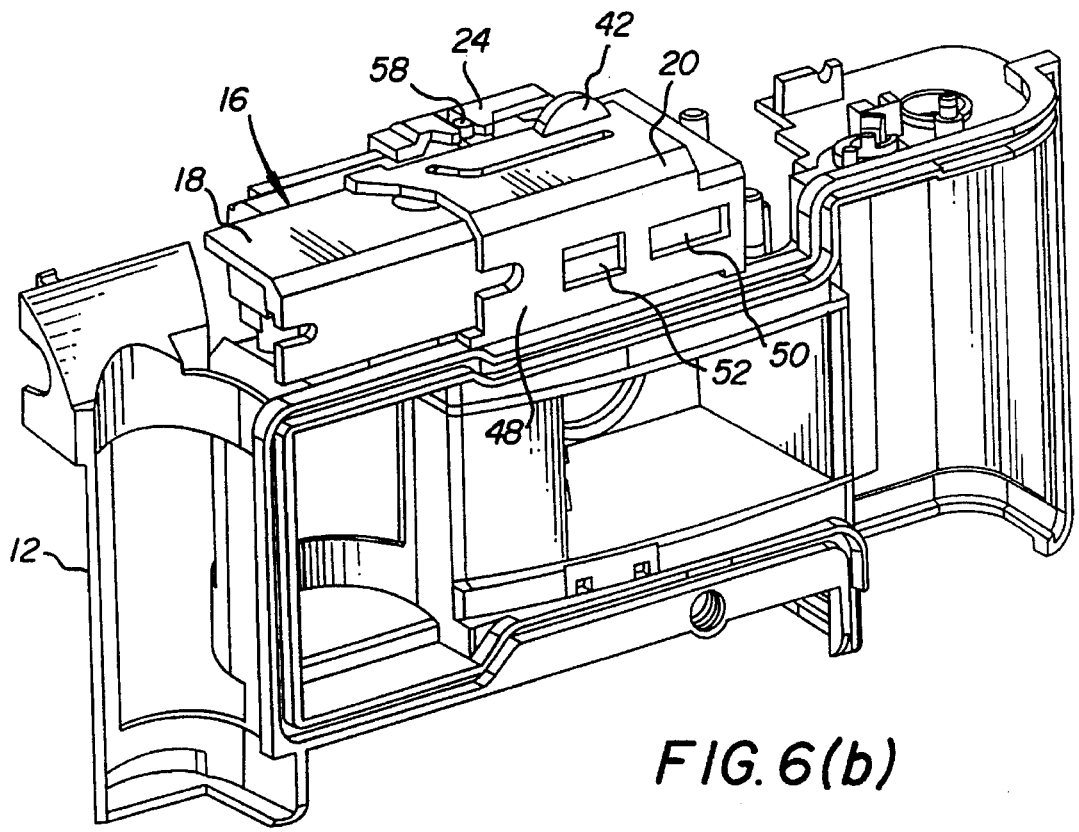
Figure 7A:
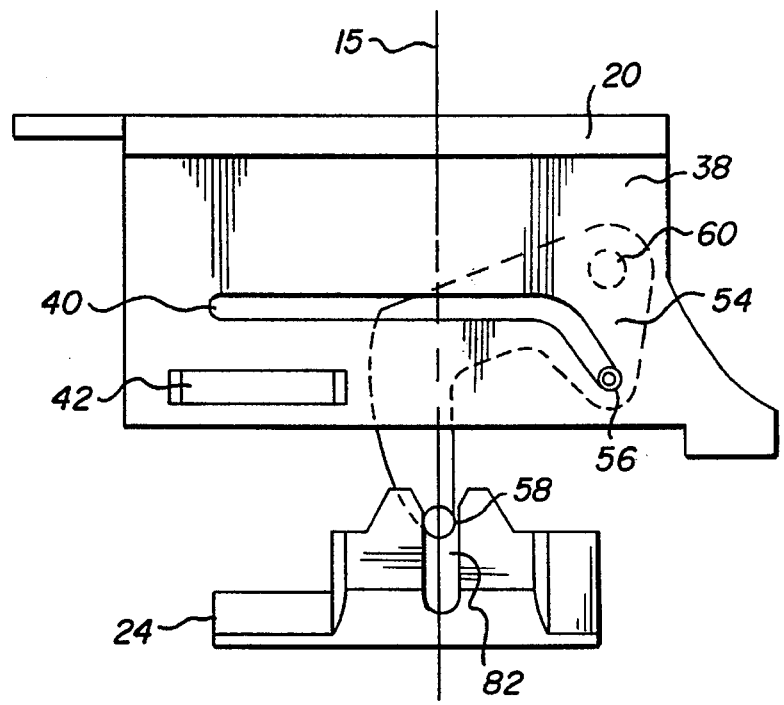
FIGS. 7(a) and 7(b) are partial top views of the normal and panoramic masking elements in the third format position relative to the movement of the rear masking portion of the viewfinder.
Figure 7B:
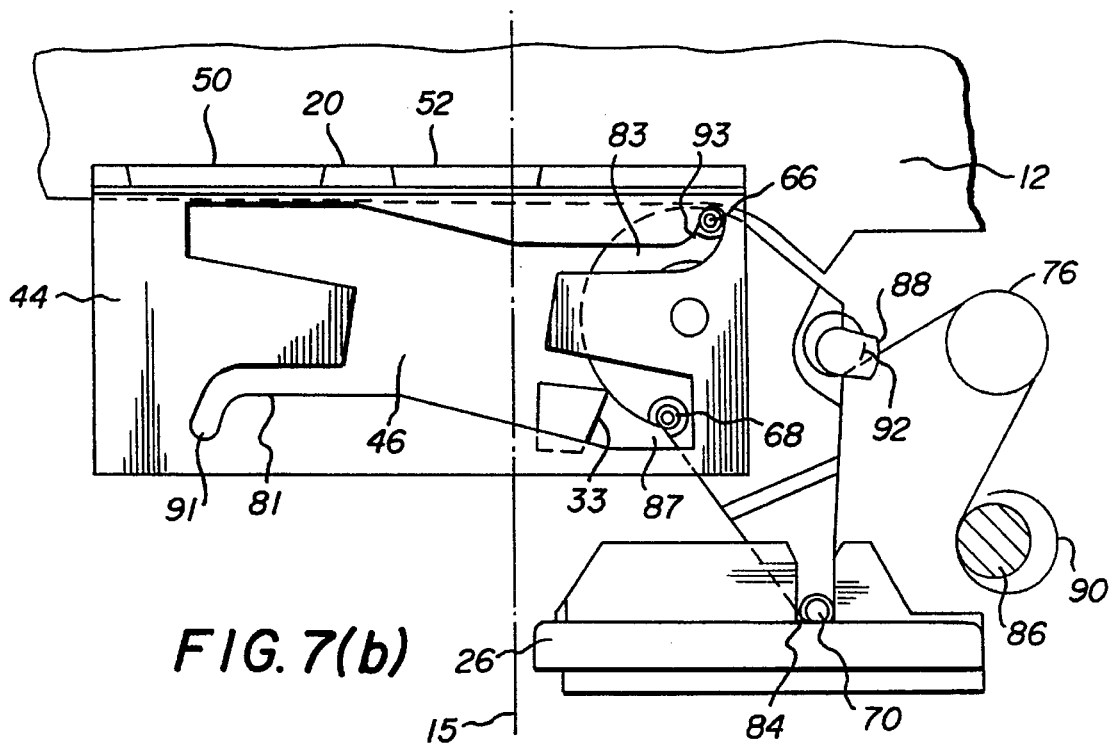

A third format-defining position is achieved according to the viewfinder masking assembly 16 of this particular embodiment by reference to FIGS. 5(b), 6(b), and 7(b). This third position, which according to this embodiment is a so-called "normal" format, is achieved by additionally translating the rear masking portion 20 a second incremental movement in the direction toward the centerline 15, FIG. 3(b) of the camera 10, preferably using the slider 42.

For simplification as above, the relative movement of each of the front masking plates 22, 24 can be described separately with reference to the FIGS. 6(a)–7(b). Referring first to FIGS. 6(a) and 7(a), the second incremental movement of the rear masking portion 20 initially produces no corresponding movement of the normal mask 24 in that the normal mask lever 54 and extending pin 56 remain stationary as the rear masking portion 20 continues to merely translate along the cam slot 40 which is sized to retain the pin.

However, as the pin 56 encounters the outwardly bending portion 43 at the end of the cam slot 40, the pin 56 bears against the surface of the slot and causes the normal mask lever 54 to pivot in a clockwise direction about the stud 60 within the recess 25 of the top surface 19 of the viewfinder body 16. This pivoting action of the normal mask lever 54 causes the pin 58 to bear against the inside of the slot and cause the normal mask 24 to translate toward the centerline 15 of the camera 10. The pivoting distance of the mask lever corresponds to the translational distance required to align the normal aperture of the front masking element 24 with the viewing area 34.

Preferably, the slot 82 in the rear of the normal mask 24 is defined by a lengthwise dimension allowing the pin 58 to remain engaged within the slot, and a sufficiently narrow width dimension allowing the pin to bear against the side of the slot 82 to impart a force sufficient to cause the normal mask 24 to translate as described. The normal mask 24 is constrained by the front surface 21 of the viewfinder main body 18 so that only a translational movement is possible; that is, the normal mask 24 is constrained by from rotating. Preferably, and according to this embodiment, each of the front masking plates 24, 26 are retained to the main body 18 by providing slots in either the main body or the rear of the masking elements to provide a slotted connection (not shown) with the front surface 21 of the main body 18 of the viewfinder masking assembly 16 in a manner commonly known.

Simultaneously, the movement of the rear masking portion 20 in the direction shown also causes movement of the panoramic mask 26. Referring to FIGS. 5(b), 6(b), and 7(b), movement of the rear masking portion 20 relative to the stationary viewfinder main body 18 in direction 39 causes the pin 66 to bear against the side cam surface 80 of the bottom plate 44. Each of the side cam surfaces 78, 80 are preferably beveled to allow the pins 66, 68 of the panoramic mask lever 62 to follow the contour of these respective surfaces until the pins are accepted by slotted areas 83, 87, respectively. The movement of the bottom plate 44 therefore causes the panoramic mask lever 62 to pivot in a counterclockwise direction about the pivot stud 74, causing the panoramic mask 26 to translate away from the centerline of the camera 10; that is mainly out of the viewing area 34 of the viewfinder 16.

Further movement of the rear masking portion 20, or of the front masking plates 24, 26 in the direction toward the centerline of the camera 10 is prevented due to the termination of the slots 40, 83, 87 on the top and bottom plates 38, 44 on the rear masking portion 20. The provision of the overcenter or toggle torsion spring 76 assists in assuring that the panoramic mask lever 62 is fully pivoted to the third format position, which due to the sizing of the bent portion 93 of the slot 83 is slightly short of the clearance surface 31, leaving a portion of the panoramic mask 26 in the viewing area.

It can be shown that reversing the direction of the slider 42 away from the centerline 15, FIG. 3(b), of the camera 10 moves each of the front masking elements 24, 26 in the same manner relative to the movement of the rear masking portion 20. That is, the slider 42 can be pushed in a first incremental movement to translate the rear masking portion 20 to the previously described intermediate (panoramic) format position, see FIGS. 4(a)–5(b) in which the aperture 30 of the panoramic mask 26 is moved squarely into the viewing area 34 of the viewfinder 16, while the aperture 28 of the normal mask 24 is cammed out of the viewing area 34 due to the respective pivoting of mask levers 54, 62.

The rear masking portion 20 can then be additionally moved a second incremental movement to pivot the pin 68 of the panoramic mask lever 62 oppositely against the side cam surfaces 78. The clockwise rotation of the panoramic mask lever 62 as described causes the panoramic mask 26 to translate, moving the panoramic aperture 30 out of the field of view 34 due to the interconnection of pin 70 with the slot 84. The pins 66, 68 of the panoramic mask lever continue to rotate in the clockwise direction and are guided into slots 81, 85. The overcenter spring 76 guarantees that the rotation is complete, thereby guiding the pins 66, 68 to the ends of respective slots 81, 85. The viewfinder masking assembly 16 has now assumed the original, or initial position described above.

The invention has been described with reference to a preferred embodiment. However, it will be appreciated that variations and modifications can be effected by a person of ordinary skill in the art without departing from the scope of the invention.

PARTS LIST FOR FIGS. 1–8

10 camera
12 frame
14 top surface
15 centerline
16 viewfinder masking assembly
18 main viewfinder body
19 top surface
20 rear masking portion
21 front surface
22 front masking portion
23 rear surface 24 normal mask plate
25 recess
26 panoramic mask plate
27 clearance surface
28 aperture (normal)
29 clearance surface
30 aperture (panoramic)
31 clearance surface
33 clearance surface
34 viewing area
38 top plate
39 arrow
40 cam slot
41 arrow
42 slider
43 bent portion
44 bottom plate
45 camming configuration
46 cutout region
47 cam surface
48 rear masking plate
49 cam surface
50 aperture (panoramic)
52 aperture (normal)
54 normal mask lever
55 top surface
56 pin
58 pin
60 stud
62 panoramic mask lever
63 top surface
66 pin
68 pin
70 pin
74 stud
76 overcenter spring
78 side cam surface
80 side cam surface
81 cam slot
82 slot
83 cam slot
84 slot
85 cam slot
86 post—frame
87 cam slot
88 post—panoramic lever
90 end (spring)
91 bent section
92 end (spring)
93 bent section
110 rear masking portion
112 cam slot
114 cam slot
116 bottom plate

We claim:

1. A camera comprising a viewfinder field of view, a rear masking blade having two different format-defining rear openings individually positionable in the field of view, and movable front masking means having two different format-defining front openings corresponding to said respective rear openings and individually positionable in the field of view, is characterized in that:

said front masking means includes two separably movable masking blades each having one of said front openings; and means interconnecting said rear masking blade with said two front masking blades to cause a first incremental movement of the rear masking blade to position one of the rear openings in the field of view to move one of the front masking blades to position its front opening in the field of view and to cause a second incremental movement of the rear masking blade to position the other rear opening in the field of view to move the other front masking blade to position its front opening in the field of view.

2. A camera according to claim 1, wherein said interconnecting means causes the front masking blade having its front opening positioned in the field of view in the first incremental movement of the rear masking blade to retract its front opening from the field of view when the rear masking blade is moved in the second increment.

3. A camera according to claim 1, wherein said rear masking blade is movable in two opposing directions to position its rear openings in the field of view.

4. A camera according to claim 1, wherein a third different format is defined when no openings of either said front masking blades or said rear masking blade are positioned in said field of view.

5. A camera comprising a viewfinder having a front masking section having two format-defining front openings and a movable rear masking section having two different format-defining rear openings corresponding to said front openings which are individually positionable in a viewing area, is characterized in that:

said front masking portion includes a pair of independently movable masking elements;

cam means separately interconnecting said rear masking portion with each of said movable front masking elements for allowing at least one of said front masking elements to position its front opening in the viewing area when said rear masking portion moves a first increment to position one of the rear openings in the viewing area, and moves the other of said front masking elements to position its front opening in the viewing area when the rear masking portion is moved a second increment to position the other rear opening in the viewing area.

6. A camera according to claim 5, wherein the front opening of the front masking element which is moved into the viewing area in the first increment is moved out of the viewing area when the rear masking portion is moved the second increment.

7. A camera according to claim 5, wherein said cam means including a pair of follower levers, each said lever having means for interconnecting said rear masking portion with a front masking element.

8. A camera according to claim 7, wherein each of said follower levers include a set of pins, wherein said rear masking portion includes a pair of cam surfaces and each of said front masking elements include a slotted portion for accepting the pins extending from said levers.

9. A camera according to claim 8, wherein said follower levers are pivotably movable by the movement of said cam surfaces of said rear masking portion, wherein one of said levers is biased by an overcenter spring to effect at least one of said increments of said rear masking portion.

* * * * *